United States Patent
Adachi et al.

(10) Patent No.: US 10,427,658 B2
(45) Date of Patent: Oct. 1, 2019

(54) BRAKE HYDRAULIC PRESSURE CONTROL DEVICE AND ANTI-LOCK BRAKE SYSTEM

(71) Applicant: Robert Bosch GmbH, Stuttgart (DE)

(72) Inventors: Eiji Adachi, Kanagawa (JP); Hiroaki Atsushi, Kanagawa (JP); Shigeki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 15/569,132

(22) PCT Filed: Mar. 2, 2016

(86) PCT No.: PCT/IB2016/051160
§ 371 (c)(1),
(2) Date: Oct. 25, 2017

(87) PCT Pub. No.: WO2016/174533
PCT Pub. Date: Nov. 3, 2016

(65) Prior Publication Data
US 2018/0105153 A1    Apr. 19, 2018

(30) Foreign Application Priority Data
Apr. 28, 2015 (JP) ................. 2015-091294

(51) Int. Cl.
*B60T 8/36* (2006.01)
*B60T 8/32* (2006.01)
*B60T 8/42* (2006.01)

(52) U.S. Cl.
CPC .......... *B60T 8/3685* (2013.01); *B60T 8/3225* (2013.01); *B60T 8/42* (2013.01)

(58) Field of Classification Search
CPC ...... B60T 8/3225; B60T 8/3685; B60T 8/368; B60T 8/341; B60T 8/363; B60T 8/344; B60T 13/66; B60T 8/26
See application file for complete search history.

(56) References Cited

U.S. PATENT DOCUMENTS 4,664,233 A * 5/1987 Tsuchida ............... B60T 8/1706
                                                                188/18 A
4,702,339 A   10/1987 Hayashi et al.
(Continued)

FOREIGN PATENT DOCUMENTS

DE    102010001542    8/2011
GB        2070166    9/1981
(Continued)

OTHER PUBLICATIONS

International Search Report for Application No. PCT/IB2016/051160 dated Nov. 15, 2016 (English Translation, 4 pages).

*Primary Examiner* — Melanie Torres Williams
(74) *Attorney, Agent, or Firm* — Michael Best & Friedrich LLP

(57) ABSTRACT

A brake hydraulic pressure control device (2) controls a fluid pressure of a brake fluid supplied to wheel cylinders mounted on brake calipers (107, 114) of a motorcycle (100). The brake hydraulic pressure control device (2) includes: a base body in which flow passages are formed; and valves which open or close the flow passages. The base body is fixed below a spring in connecting portions (130A, 130B) which connect a trunk portion (101) of the motorcycle (100) and a wheels (front wheel (106), rear wheel (113)) to each other.

13 Claims, 11 Drawing Sheets

(56) References Cited

U.S. PATENT DOCUMENTS

| | | | | |
|---|---|---|---|---|
| 4,792,194 A | * | 12/1988 | Hayashi | B60T 8/1706 188/181 A |
| 6,260,933 B1 | * | 7/2001 | Dinkel | B60T 8/368 303/113.1 |
| 2006/0244309 A1 | * | 11/2006 | Claussen | B60T 8/1708 303/123 |
| 2010/0071985 A1 | * | 3/2010 | Harada | B60T 8/3685 180/219 |
| 2011/0047999 A1 | * | 3/2011 | Koyama | B60T 8/368 60/459 |
| 2013/0306180 A1 | * | 11/2013 | Weh | F15B 21/00 137/884 |
| 2014/0091552 A1 | * | 4/2014 | Tominaga | B62K 11/04 280/284 |
| 2017/0210364 A1 | * | 7/2017 | Sagayama | B60T 8/34 |

FOREIGN PATENT DOCUMENTS

| | | |
|---|---|---|
| JP | 2007216814 | 8/2007 |
| JP | 2015074345 | 4/2014 |
| JP | 2014213791 | 11/2014 |

* cited by examiner

BRAKE HYDRAULIC PRESSURE CONTROL DEVICE AND ANTI-LOCK BRAKE SYSTEM

BACKGROUND OF THE INVENTION

The present invention relates to a brake hydraulic pressure control device for controlling a hydraulic pressure of a brake fluid supplied to a wheel cylinder mounted on a brake caliper of a motorcycle, and an anti-lock brake system in which the brake hydraulic pressure control device is incorporated.

As a conventional anti-lock brake system, for example, there has been known an anti-lock brake system in which a brake hydraulic pressure control device having a base body in which a flow passage communicating with a wheel cylinder is formed and a valve which opens or closes the flow passage is incorporated. In such a brake hydraulic pressure control device, the base body is mounted on a trunk portion of a motorcycle (two-wheeled vehicle or three-wheeled vehicle) (see JP-A-2007-216814, for example).

SUMMARY OF THE INVENTION

In the above-mentioned brake hydraulic pressure control device, it is necessary to ensure a space for mounting the brake hydraulic pressure control device in the trunk portion of the motorcycle, and it is necessary to change a layout of respective parts of the trunk portion depending on whether or not the brake hydraulic pressure control device is incorporated in the brake system. Further, in the above-mentioned brake hydraulic pressure control device, it is necessary to arrange a pipe of the anti-lock brake system having a complicated path in the trunk portion of the motorcycle. That is, the above-mentioned brake hydraulic pressure control device has drawbacks that cost performance, manufacturing performance and the like of the motorcycle are low.

The present invention has been made in view of the above-mentioned technical problem, and it is an object of the present invention to provide a brake hydraulic pressure control device which is mounted on a motorcycle in a state where cost performance, manufacturing performance and the like can be ensured. It is another object of the present invention to provide an anti-lock brake system in which such a brake hydraulic pressure control device is incorporated.

The brake hydraulic pressure control device according to the present invention is a brake hydraulic pressure control device which controls a fluid pressure of a brake fluid supplied to a wheel cylinder mounted on a brake caliper of a motorcycle, wherein the brake hydraulic pressure control device includes a base body in which a flow passage is formed, and a valve which opens or closes the flow passage, and the base body is fixed below a spring in a connecting portion which connects a trunk portion of the motorcycle and a wheel to each other.

An anti-lock brake system according to the present invention is an anti-lock brake system in which the above-mentioned brake hydraulic pressure control device is incorporated.

In the brake hydraulic pressure control device according to the present invention, the base body is fixed to the connecting portion which connects the trunk portion and the wheel of the motorcycle. That is, the base body is not mounted on the trunk portion. Accordingly, for example, necessity of changing a layout of respective parts of the trunk portion depending on whether or not the brake hydraulic pressure control device is incorporated into the brake system is reduced, and necessity of arranging a pipe of the anti-lock brake system having a complicated path in the trunk portion can be reduced. Further, by fixing the base body below the spring at the connecting portion and hence, it is possible to suppress lowering of design performance and the degree of freedom in designing which may be caused by mounting the base body on a portion other than the trunk portion. Accordingly, it is possible to enhance cost performance, manufacturing performance and the like of a motor cycle while ensuring design property and the degree of freedom in designing and the like.

DETAILED DESCRIPTION

Hereinafter, an anti-lock brake system according to the present invention is described with reference to drawings.

The configuration and the like described hereinafter form merely an example, and a brake hydraulic pressure control device and an anti-lock brake system according to the present invention are not limited to cases provided with such configuration and the like. Further, in the respective drawings, there may be cases where the same symbols are given to members or parts identical or similar to each other. Further, with respect to the detailed structures, the illustration of these structures is simplified or omitted when appropriate. The repeated description is simplified or omitted when appropriate.

Hereinafter, an anti-lock brake system according to the first embodiment is described.

The configuration of the anti-lock brake system according to the first embodiment is described.

Figure 1:
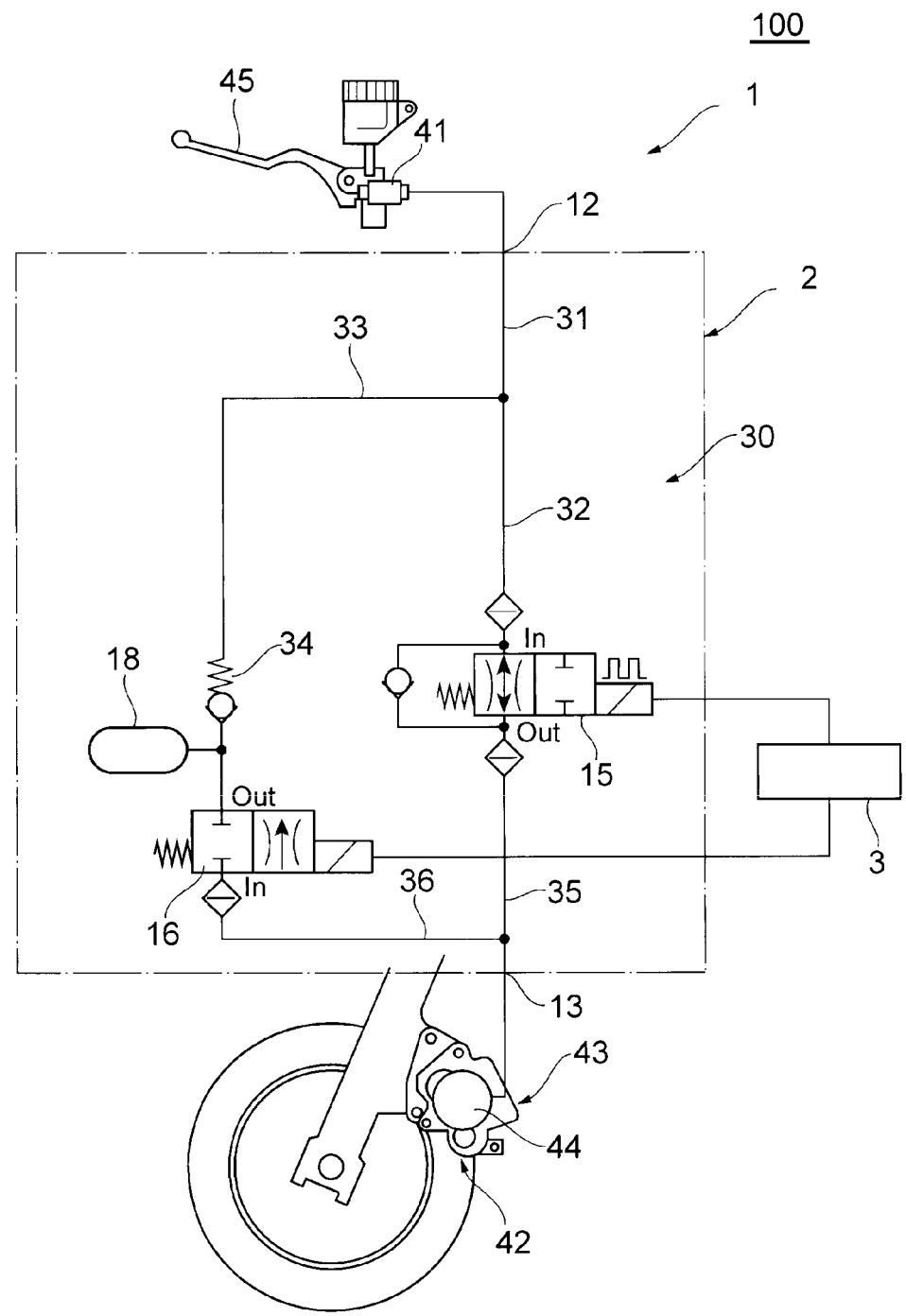
FIG. 1 is a system block chart showing the constitution of an anti-lock brake system according to a first embodiment of the present invention.

FIG. 1 is a system block diagram showing the configuration of the anti-lock brake system according to the first embodiment of the present invention.

As shown in FIG. 1, an anti-lock brake system 1 is mounted on a motorcycle 100 (two-wheeled vehicle or three-wheeled vehicle), and includes a brake hydraulic pressure control device 2, and a controller 3 (ECU) which electrically controls the brake hydraulic pressure control device 2. By controlling the brake hydraulic pressure control device 2 by the controller 3, an anti-lock brake control of the motorcycle 100 is performed. The anti-lock brake system 1 includes at least one brake hydraulic pressure control device 2. The anti-lock brake system 1 may particularly preferably be a pumpless anti-lock brake system.

The brake hydraulic pressure control device 2 includes a hydraulic circuit 30 which can transfer a brake fluid between a master cylinder 41 and a wheel cylinder 44 mounted on a brake caliper 43 of a brake 42. The hydraulic circuit 30 includes flow passages 31, 32, 33, 35, 36, a check valve 34, an inlet-side electromagnetic valve 15 (inlet valve), an outlet-side electromagnetic valve 16 (outlet valve), and an accumulator 18. The hydraulic circuit 30 is filled with a brake fluid. A fluid pressure applied to the wheel cylinder 44 is controlled by performing an open/close control of the inlet-side electromagnetic valve 15 and the outlet-side electromagnetic valve 16 so that a brake control of a wheel is performed.

The master cylinder 41 includes a piston portion (not shown in the drawing) which moves interlockingly with the movement of a brake lever 45 when the brake lever 45 is manipulated by an operator, and the master cylinder 41 is connected to the flow passage 31. A pressure of a brake fluid in the hydraulic circuit 30 is increased or decreased due to the movement of the piston portion. An end portion of the flow passage 31 on a side where the flow passage 31 is connected to the master cylinder 41 corresponds to a master cylinder port 12 formed in a base body 6 described later.

A downstream side of the flow passage 31 is branched into the flow passage 32 and the flow passage 33. The flow passage 32 is connected to an inlet side of the inlet-side electromagnetic valve 15 through a filter. The flow passage 33 is connected to an outlet side of the outlet-side electromagnetic valve 16 through the check valve 34. The accumulator 18 is connected between the check valve 34 and the outlet-side electromagnetic valve 16 of the flow passage 33.

The flow passage 35 is connected to an outlet side of the inlet-side electromagnetic valve 15 by way of a filter. The flow passage 35 is connected to the wheel cylinder 44 at an end portion thereof on a side opposite to an end portion thereof on a side where the flow passage 35 is connected to the inlet-side electromagnetic valve 15. The flow passage 36 is connected to an inlet-side of the outlet-side electromagnetic valve 16 through a filter. The flow passage 36 is connected to the flow passage 35 at an end portion thereof on a side opposite to an end portion thereof on a side where the flow passage 36 is connected to the outlet-side electromagnetic valve 16. An end portion of the flow passage 35 on a side where the flow passage 35 is connected to the wheel cylinder 44 corresponds to a wheel cylinder port 13 formed in the base body 6 described later.

The inlet-side electromagnetic valve 15 is an electromagnetic valve which is opened in a non-energized time. In a non-energized time, the flow of a brake fluid is released in both directions, that is, in the direction from the inlet to the outlet of the inlet-side electromagnetic valve 15 and in the direction from the outlet to the inlet of the inlet-side electromagnetic valve 15 through a throttle. When an anti-lock brake control is performed so that the inlet-side electromagnetic valve 15 is energized, the inlet-side electromagnetic valve 15 is brought into a closed state by a solenoid so that the flow of the brake liquid between the inlet and the outlet of the inlet-side electromagnetic valve 15 is interrupted. The inlet and the outlet of the inlet-side electromagnetic valve 15 are used for the sake in convenience of explanation, and the port on a flow passage 32 side is defined as the inlet, and the port on a flow passage 35 side is defined as the outlet. The inlet-side electromagnetic valve 15 may have other structures. The inlet-side electromagnetic valve 15 corresponds to "valve" according to the present invention.

The outlet-side electromagnetic valve 16 is an electromagnetic valve which is closed in a non-energized time. In a non-energized time, the flow of a brake fluid between the inlet and the outlet of the outlet-side electromagnetic valve 16 is interrupted. When an anti-lock brake control is performed so that the outlet-side electromagnetic valve 16 is energized, the outlet-side electromagnetic valve 16 is brought into an open state by a solenoid so that the flow of a brake liquid from the inlet to the outlet of the outlet-side electromagnetic valve 16 is released. The inlet and the outlet of the outlet-side electromagnetic valve 16 are used for the sake of convenience of explanation, and the port on a flow passage 36 side is defined as the inlet, and the port on a flow passage 33 side is defined as the outlet. The outlet-side electromagnetic valve 16 may have other structures. The outlet-side electromagnetic valve 16 corresponds to "valve" according to the present invention.

The check valve 34 allows the flow of a brake fluid toward a downstream side, that is, in a direction toward the flow passages 31, 32 from the accumulator 18 in the flow passage 33.

A brake control performed by the anti-lock brake system 1 is, for example, a known control. The hydraulic circuit 30 is operated as follows, for example.

During a period where a normal brake control is performed by manipulating the brake lever 45, when the controller 3 detects locking of a wheel or a possibility of locking of the wheel by means of a wheel rotation sensor (not shown in the drawing), for example, an anti-lock brake control is started.

When the anti-lock brake control is started, the controller 3 closes the inlet-side electromagnetic valve 15 so that the supply of a brake fluid into the wheel cylinder 44 is interrupted thus stopping the increase of a pressure in the wheel cylinder 44. On the other hand, the controller 3 releases the outlet-side electromagnetic valve 16 so that the flow of a brake fluid into the accumulator 18 from the wheel cylinder 44 is allowed thus decreasing the pressure in the wheel cylinder 44. Accordingly, locking of the wheel is released or avoided. When the controller 3 determines that a predetermined amount of pressure reduction is made in the wheel cylinder 44, the controller 3 closes the outlet-side electromagnetic valve 16 and opens the inlet-side electromagnetic valve 15 for a short time thus increasing the pressure in the wheel cylinder 44.

The controller 3 may perform opening/closing of the outlet-side electromagnetic valve 16 only one time or plural times. When the controller 3 performs opening/closing of the outlet-side electromagnetic valve 16 plural times, the increase or the decrease of pressure in the wheel cylinder 44 is repeated plural times.

When the anti-lock brake control is finished, the controller 3 releases the inlet-side electromagnetic valve 15 so that a normal brake control is restored.

When the brake lever 45 is returned, the inside of the master cylinder 41 is brought into an atmospheric pressure state so that a brake fluid in the wheel cylinder 44 is returned. Further, due to the generation of an atmospheric pressure state, a brake fluid in the accumulator 18 is returned through the check valve 34.

The configuration of the brake hydraulic pressure control device of the anti-lock brake system according to the first embodiment is described.

Figure 2:
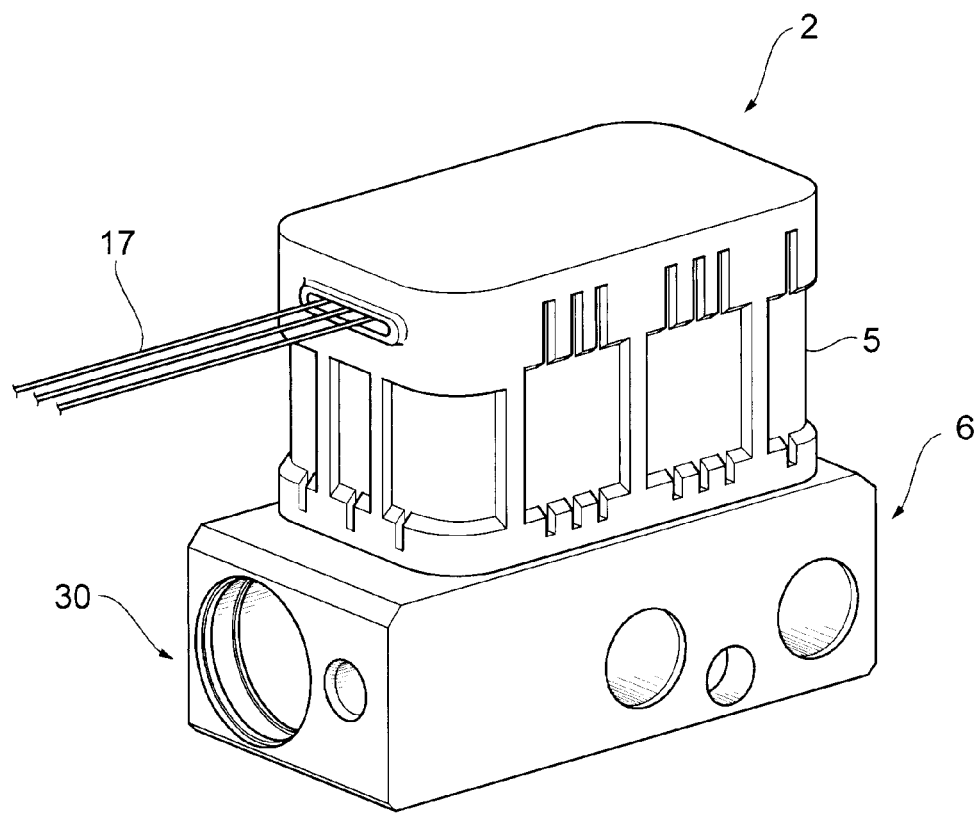
FIG. 2 is a perspective view showing the constitution of a brake hydraulic pressure control device of the anti-lock brake system according to the first embodiment of the present invention.
Figure 3:
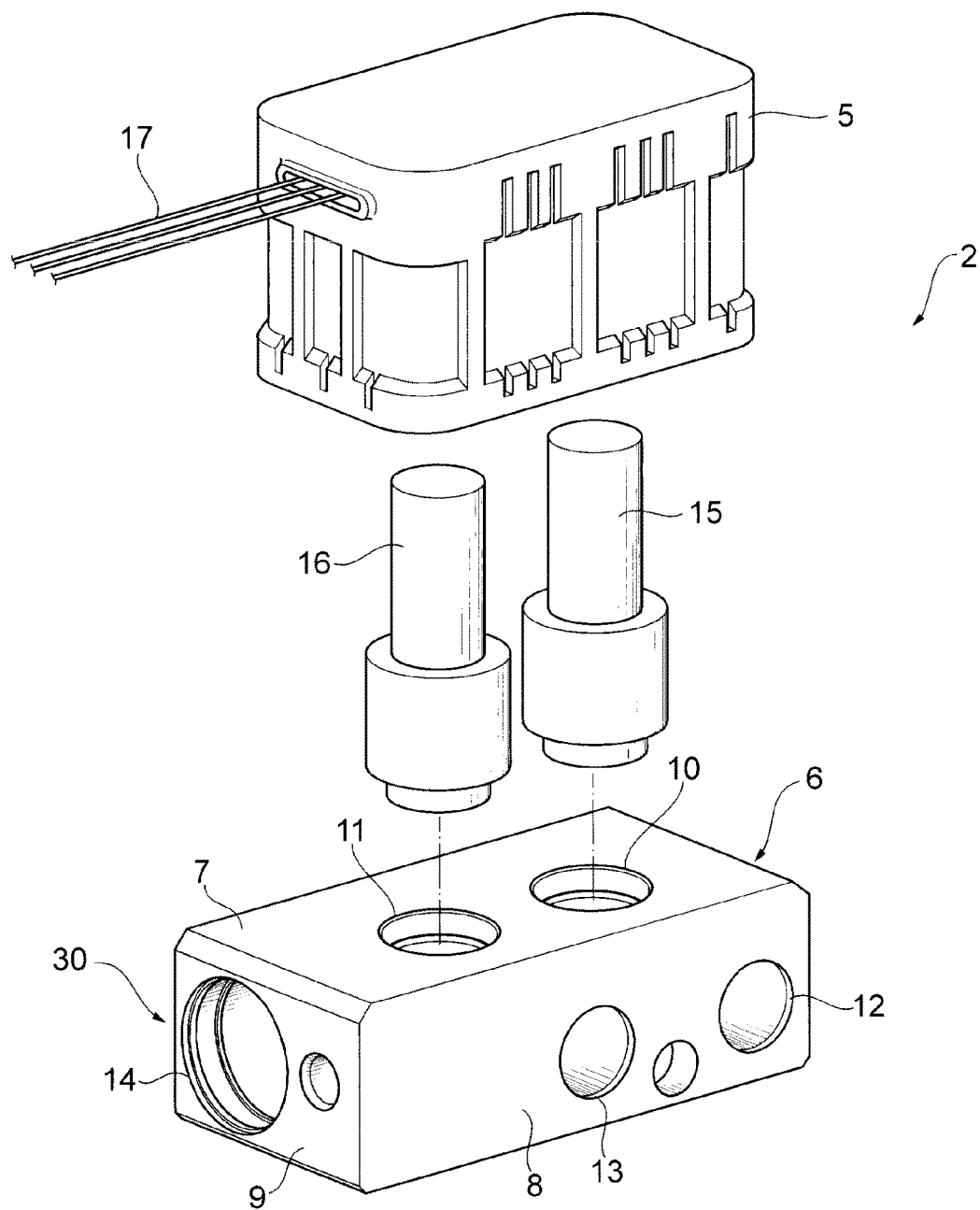
FIG. 3 is an exploded perspective view showing the constitution of the brake hydraulic pressure control device of the anti-lock brake system according to the first embodiment of the present invention.

FIG. 2 is a perspective view showing the configuration of the brake hydraulic pressure control device of the anti-lock brake system according to the first embodiment of the present invention. FIG. 3 is an exploded perspective view showing the constitution of the brake hydraulic pressure control device of the anti-lock brake system according to the first embodiment of the present invention.

As shown in FIG. 2 and FIG. 3, the brake hydraulic pressure control device 2 includes a valve case 5 and the base body 6 in which the flow passages 31, 32, 33, 35, 36 of the hydraulic circuit 30 are formed. The inlet-side electromagnetic valve 15 and the outlet-side electromagnetic valve 16 are held by the base body 6, and are housed in the valve case 5.

The base body 6 is a member made of metal such as an aluminum alloy, and has at least a first surface 7, a second surface 8 and a third surface 9. It is particularly preferable that the first surface 7, the second surface 8 and the third surface 9 be orthogonal to each other. For example, the base body 6 has a rectangular parallelepiped shape, and the flow passages 31, 32, 33, 35, 36 are formed in the base body 6 by cutting.

In the base body 6, an inlet valve hole 10 in which the inlet-side electromagnetic valve 15 is housed, an outlet valve hole 11 in which the outlet-side electromagnetic valve 16 is housed, the master cylinder port 12 for connecting the base body 6 to the master cylinder 41, the wheel cylinder port 13 for connecting the base body 6 to the wheel cylinder 44, and an accumulator port 14 for connecting the base body 6 to the accumulator 18 are formed. The accumulator 18 may be provided as a member connected to the accumulator port 14 and a member separate from the base body 6. Further, the accumulator 18 may be formed by sealing a space per se formed inside the accumulator port 14. The inlet valve hole 10 and the outlet valve hole 11 are formed in the first surface 7, the master cylinder port 12 and the wheel cylinder port 13 are formed in the second surface 8, and the accumulator port 14 is formed in the third surface 9. With such a configuration, the brake hydraulic pressure control device 2 can be miniaturized and can be light-weighted.

The valve case 5 is made of a resin, for example. A power source line 17 is arranged in a state where the power source line 17 penetrates an opening formed in the valve case 5. That is, a region of the power source line 17 arranged inside the valve case 5 and a region of the power source line 17 arranged outside the valve case 5 are connected to each other not by means of a connector. In the inside of the valve case 5, the power source line 17 is electrically connected to the inlet-side electromagnetic valve 15 or the outlet-side electromagnetic valve 16. The controller 3 controls an operation of the brake hydraulic pressure control device 2 by controlling driving of the inlet-side electromagnetic valve 15 and the outlet-side electromagnetic valve 16 through the power source line 17. To be more specific, the controller 3 opens or closes the respective flow passages of the hydraulic circuit 30 by controlling driving of the inlet-side electromagnetic valve 15 and the outlet-side electromagnetic valve 16.

Mounting of the anti-lock brake system according to the first embodiment is described.

Figure 4:
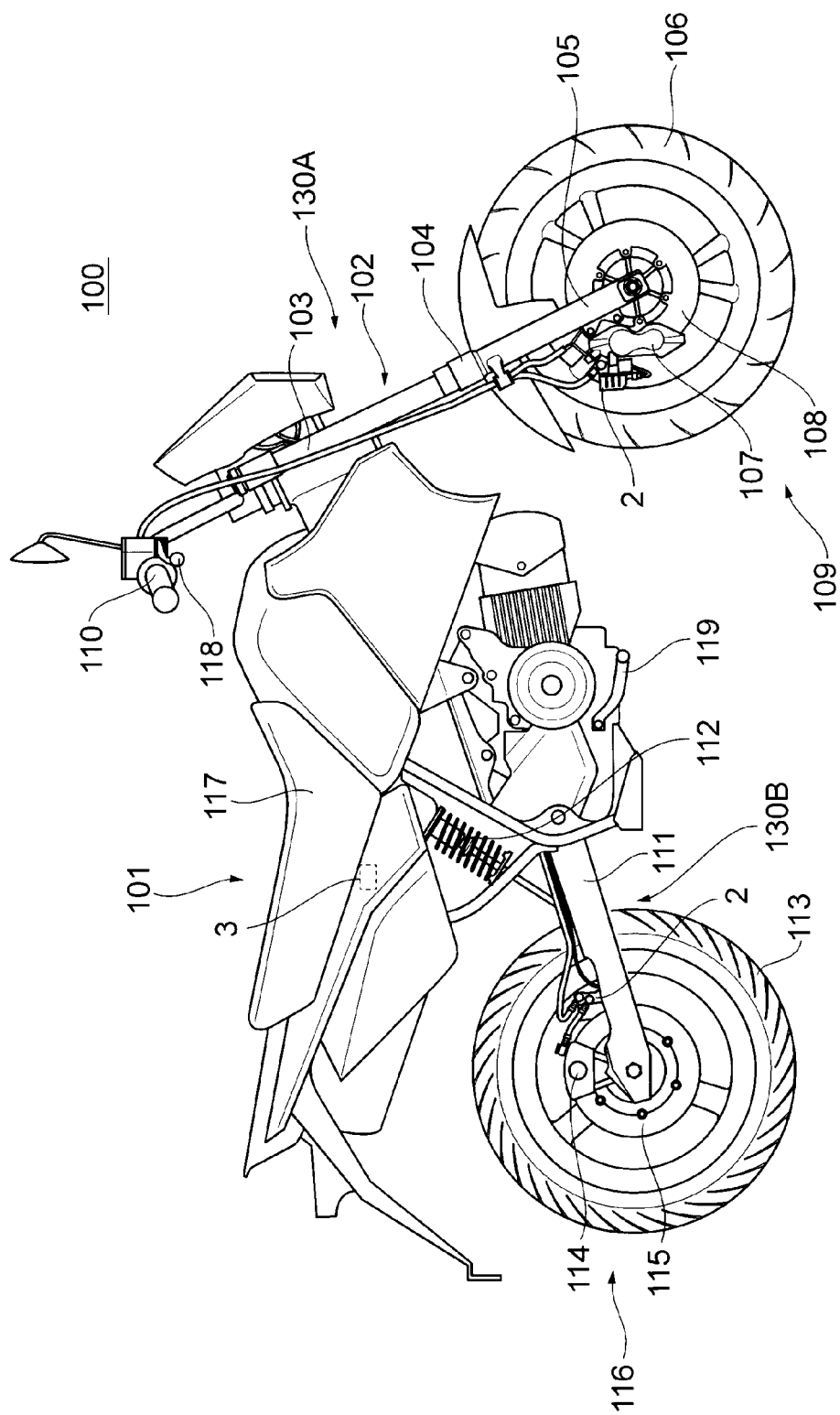
FIG. 4 is a view for explaining a state where the anti-lock brake system according to the first embodiment of the present invention is mounted on a motorcycle.

FIG. 4 is a view for explaining a state where the anti-lock brake system according to the first embodiment of the present invention is mounted on a motorcycle. In FIG. 4, the case is described where the anti-lock brake system 1 is mounted on a two-wheeled vehicle. However, the anti-lock brake system 1 can be mounted on a three-wheeled vehicle in the same manner.

As shown in FIG. 4, the motorcycle 100 includes: a trunk portion 101; a front wheel 106; a rear wheel 113; a connecting portion 130A which connects the trunk portion 101 and the front wheel 106 to each other; and a connecting portion 130B which connects the trunk portion 101 and the rear wheel 113 to each other. The trunk portion 101 includes a seat 117 on which a driver sits.

The connecting portion 130A includes a pair of front forks 102 rotatably and pivotally supported on the trunk portion 101 on a front side thereof. The front fork 102 includes a front fork upper end portion 103 on an upper end side, a front suspension 104 which functions as a suspension device, and a front fork lower end portion 105 on a lower end side. By connecting the front fork upper end portion 103 and the front fork lower end portion 105 to each other by way of the front suspension 104, the front fork 102 is extendable and shrinkable along an axis of the front fork 102. The front wheel 106 is rotatably and pivotally supported on the front fork lower end portion 105. A brake caliper 107, that is, the brake caliper 43 shown in FIG. 1 is mounted on the front fork lower end portion 105, and a rotor 108 is coaxially mounted on the front wheel 106. The brake caliper 107 and the rotor 108 form a front brake 109, that is, the brake 42 shown in FIG. 1. A handle bar 110 is mounted on an upper end of the front fork upper end portion 103.

The motorcycle 100 includes swing arms 111 which form a pair of rear forks swingably and pivotally supported on the trunk portion 101, and a rear suspension 112 which is disposed between the trunk portion 101 and the swing arms 111 and functions as a suspension device on a rear side thereof. The connecting portion 130B includes the swing arms 111. A brake caliper 114, that is, the brake caliper 43 shown in FIG. 1 is mounted on rear ends of the swing arms 111. Further, a rotor 115 is coaxially mounted on the rear wheel 113. The brake caliper 114 and the rotor 115 form a rear brake 116, that is, the brake 42 shown in FIG. 1.

That is, in the motorcycle 100, the connecting portion 130A is defined as a constitutional element which connects the trunk portion 101 and the front wheel 106 to each other, and includes the front forks 102 and the brake caliper 107 on a front wheel side. The connecting portion 130B is defined as a constitutional element which connects the trunk portion 101 and the rear wheel 113, and includes the swing arms 111 and the brake caliper 114 on a rear wheel side. Further, in the motorcycle 100, a trunk portion 101 side of the connecting portion 130A with respect to a spring not shown in the drawing of the front suspension 104 is defined as "above the spring" and a front wheel 106 side of the connecting portion 130A with respect to the spring is defined as "below the spring". Further, in the motorcycle 100, a trunk portion 101 side of the connecting portion 130B with respect to a portion to which the rear suspension 112 is connected is defined as "above the spring", and a rear wheel 113 side of the connecting portion 130B with respect to the portion is defined as "below the spring".

In the motorcycle 100, the brake hydraulic pressure control device 2 of the anti-lock brake system 1 is arranged "below the spring" in the connecting portions 130A, 130B. In the motorcycle 100, it is particularly preferable to arrange the brake hydraulic pressure control device 2 at a portion other than a primary ground contact portion and a secondary ground contact portion. In this case, a portion of the motorcycle 100 which is firstly brought into contact with an external object such as a road surface (primary ground contact) when the motorcycle 100 falls over is defined as the primary ground contact portion, and a portion of the motorcycle 100 which is secondly brought into contact with the external object such as the road surface (secondary ground contact) subsequent to the primary ground contact is defined as the secondary ground contact portion.

The controller 3 of the anti-lock brake system 1 is arranged on the trunk portion 101 in the motorcycle 100. For example, the controller 3 is arranged below the seat 117 in the trunk portion 101. The controller 3 may be arranged above the spring in the connecting portions 130A, 130B in the motorcycle 100. That is, the controller 3 is arranged at a portion remote from the base body 6 of the brake hydraulic pressure control device 2 in the motorcycle 100.

When the anti-lock brake system 1 is not a pumpless anti-lock brake system, a pump of the anti-lock brake system 1 may be arranged on the trunk portion 101 or above the spring of the connecting portions 130A, 130B in the motorcycle 100. That is, it is sufficient that the pump of the anti-lock brake system 1 is arranged at positions other than "below the spring" of the connecting portions 130A, 130B in the motorcycle 100.

The brake hydraulic pressure control device 2 is connected to the master cylinder 41 through a hydraulic pressure pipe (brake pipe). The master cylinder 41 connected to the brake hydraulic pressure control device 2 for the front wheel is arranged in the vicinity of a front brake lever 118 mounted on the handle lever 110, that is, in the vicinity of the brake lever 45 shown in FIG. 1. The master cylinder 41 connected to the brake hydraulic pressure control device 2 for the rear wheel is arranged in the vicinity of a rear brake lever 119, that is, in the vicinity of the brake lever 45 shown in FIG. 1.

In the anti-lock brake system 1, for example, when the front brake lever 118 is manipulated by a driver, a braking operation of the front brake 109 is performed by the brake hydraulic pressure control device 2. Further, in the anti-lock brake system 1, for example, when the rear brake lever 119 is manipulated by the driver, a braking operation of the rear brake 116 is performed by the brake hydraulic pressure control device 2. Further, in the anti-lock brake system 1, for example, during an anti-lock brake control, a braking operation of the front brake 109 and a braking operation of the rear brake 116 are performed by the brake hydraulic pressure control device 2 and the controller 3.

FIG. 4 shows the case where the anti-lock brake system 1 includes two brake hydraulic pressure control devices 2 and one controller 3. However, the present invention is not limited to such a case. That is, the controller 3 may be provided to the respective brake hydraulic pressure control devices 2. Further, the anti-lock brake system 1 may have one common master cylinder 41 for a plurality of brake hydraulic pressure control devices 2.

The detail of mounting of the brake hydraulic pressure control device of the anti-lock brake system according to the first embodiment is described.

Figure 5:
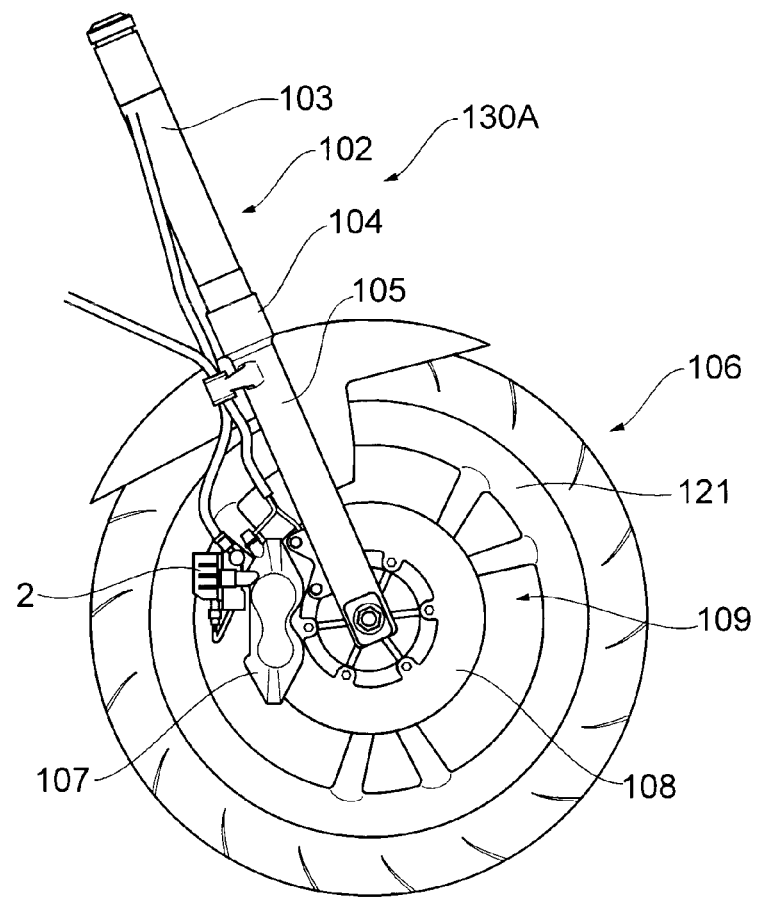
FIG. 5 is a side view of an essential part for explaining one example of a state where the brake hydraulic pressure control device of the anti-lock brake system according to the first embodiment of the present invention is mounted on the motorcycle.
Figure 6:
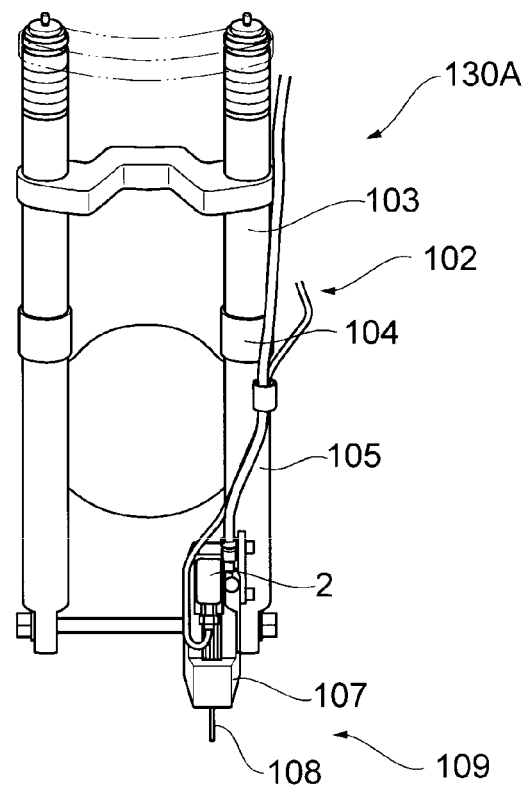
FIG. 6 is a back view of an essential part for explaining one example of the state where the brake hydraulic pressure control device of the anti-lock brake system according to the first embodiment of the present invention is mounted on the motorcycle.

FIG. 5 is a side view of an essential part for explaining one example of a state where the brake hydraulic pressure control device of the anti-lock brake system according to the first embodiment of the present invention is mounted on the motorcycle. FIG. 6 is a back view of an essential part for explaining one example of the state where the brake hydraulic pressure control device of the anti-lock brake system according to the first embodiment of the present invention is mounted on the motorcycle. In FIG. 6, the illustration of the front wheel 106 is omitted.

As shown in FIG. 5 and FIG. 6, the base body 6 of the brake hydraulic pressure control device 2 is fixed to the brake caliper 107 of the front brake 109 "below the spring" of the connecting portion 130A directly or by way of a retainer. For example, the base body 6 of the brake hydraulic pressure control device 2 is fixed to an upper surface of the brake caliper 107. The brake hydraulic pressure control device 2 is arranged in a state where the base body 6 and the valve case 5 do not interfere with a rotating member such as the front wheel 106. Further, the brake hydraulic pressure control device 2 may preferably be arranged in a state where the base body 6 and the valve case 5 are positioned inside a wheel rim 121 of the front wheel 106. By arranging the brake hydraulic pressure control device 2 in such a state, it is possible to surely position the brake hydraulic pressure control device 2 at a portion other than the primary ground contact portion and the secondary ground contact portion.

Figure 7:
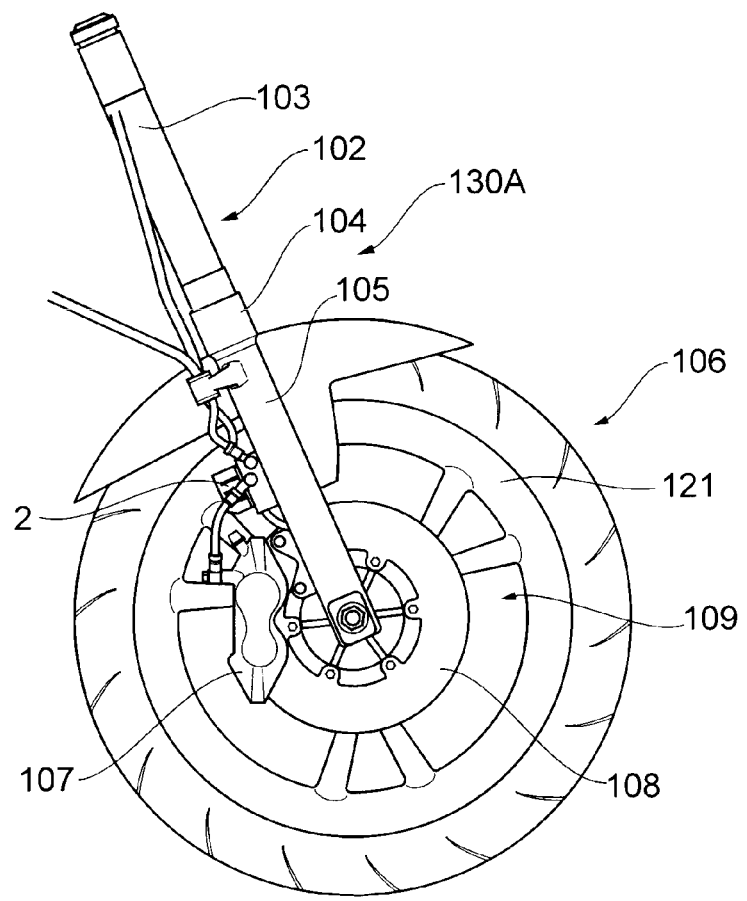
FIG. 7 is a side view of an essential part for explaining another example of the state where the brake hydraulic pressure control device of the anti-lock brake system according to the first embodiment of the present invention is mounted on the motorcycle.
Figure 8:
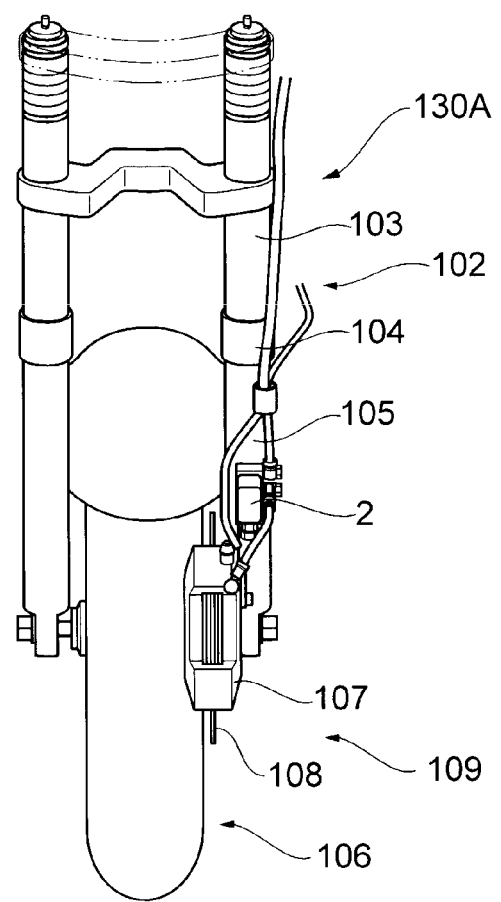
FIG. 8 is a back view of an essential part for explaining another example of the state where the brake hydraulic pressure control device of the anti-lock brake system according to the first embodiment of the present invention is mounted on the motorcycle.

FIG. 7 is a side view of an essential part for explaining another example of the state where the brake hydraulic pressure control device of the anti-lock brake system according to the first embodiment of the present invention is mounted on the motorcycle. FIG. 8 is a back view of an essential part for explaining another example of the state where the brake hydraulic pressure control device of the anti-lock brake system according to the first embodiment of the present invention is mounted on the motorcycle.

As shown in FIG. 7 and FIG. 8, the base body 6 of the brake hydraulic pressure control device 2 is fixed to the front fork 102 "below the spring" of the connecting portion 130A directly or by way of a retainer. For example, the base body 6 of the brake hydraulic pressure control device 2 is fixed to the front fork lower end portion 105 of the front fork 102. The brake hydraulic pressure control device 2 is arranged in a state where the base body 6 and the valve case 5 do not interfere with a rotating member such as the front wheel 106. Further, the brake hydraulic pressure control device 2 may preferably be arranged in a state where the base body 6 and the valve case 5 are positioned at a portion other than a side portion of the front fork 102. With such an arrangement, it is possible to surely position the brake hydraulic pressure control device 2 at a portion other than the primary ground contact portion and the secondary ground contact portion.

Figure 9:
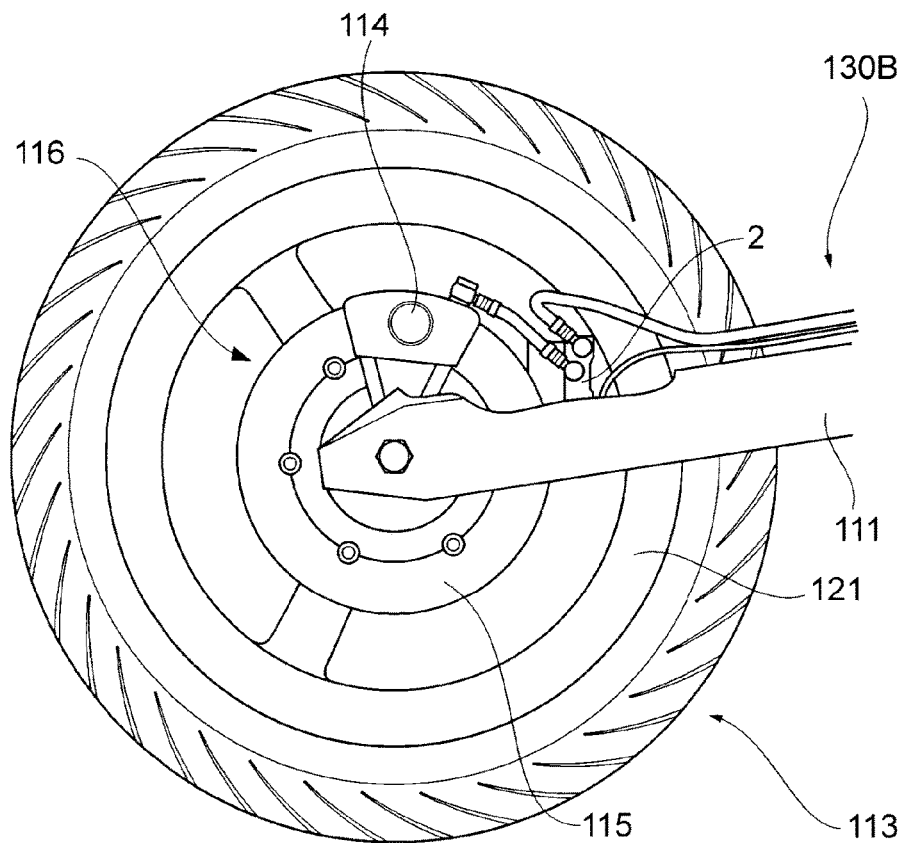
FIG. 9 is a side view of an essential part for explaining still another example of the state where the brake hydraulic pressure control device of the anti-lock brake system according to the first embodiment of the present invention is mounted on the motorcycle.
Figure 10:
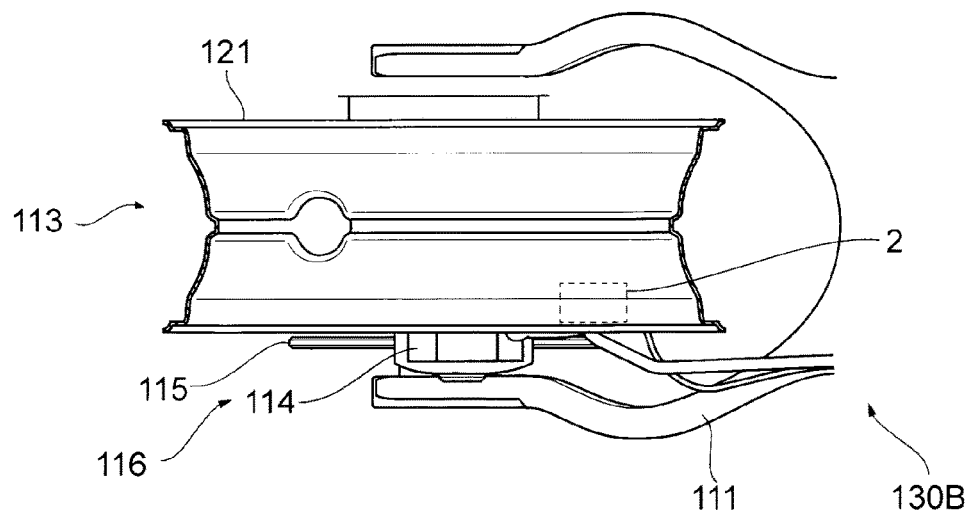
FIG. 10 is a top plan view of an essential part for explaining still another example of the state where the brake hydraulic pressure control device of the anti-lock brake system according to the first embodiment of the present invention is mounted on the motorcycle.

FIG. 9 is a side view of an essential part for explaining still another example of the state where the brake hydraulic pressure control device of the anti-lock brake system according to the first embodiment of the present invention is mounted on the motorcycle. FIG. 10 is a top plan view of an essential part for explaining still another example of the state where the brake hydraulic pressure control device of the anti-lock brake system according to the first embodiment of the present invention is mounted on the motorcycle. In FIG. 10, the illustration of a tire of the rear wheel 113 is omitted.

As shown in FIG. 9 and FIG. 10, the base body 6 of the brake hydraulic pressure control device 2 is fixed to the swing arm 111 "below the spring" of the connecting portion 130B directly or by way of a retainer. The base body 6 of the brake hydraulic pressure control device 2 may be fixed to the brake caliper 114 of the rear brake 116. The brake hydraulic pressure control device 2 is arranged in a state where the base body 6 and the valve case 5 do not interfere with rotating members such as the rear wheel 113. The brake hydraulic pressure control device 2 may preferably be arranged in a state where the base body 6 and the valve case 5 are positioned inside the wheel rim 121 of the rear wheel 113. Further, the brake hydraulic pressure control device 2 may preferably be arranged in a state where the base body 6 and the valve case 5 are positioned on a side close to the center of the wheel rim 121 of the rear wheel 113 with reference to the rotor 115. With such an arrangement, it is possible to surely position the brake hydraulic pressure control device 2 at a portion other than the primary ground contact portion and the secondary ground contact portion.

Figure 11:
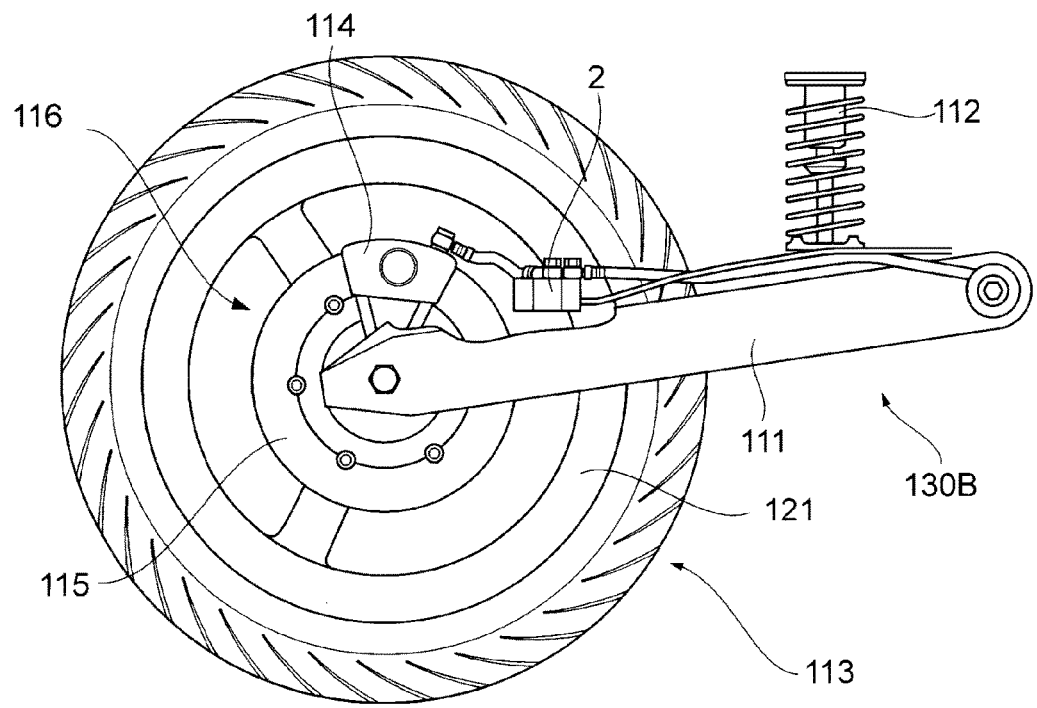
FIG. 11 is a side view of an essential part for explaining further another example of the state where the brake hydraulic pressure control device of the anti-lock brake system according to the first embodiment of the present invention is mounted on the motorcycle.
Figure 12:
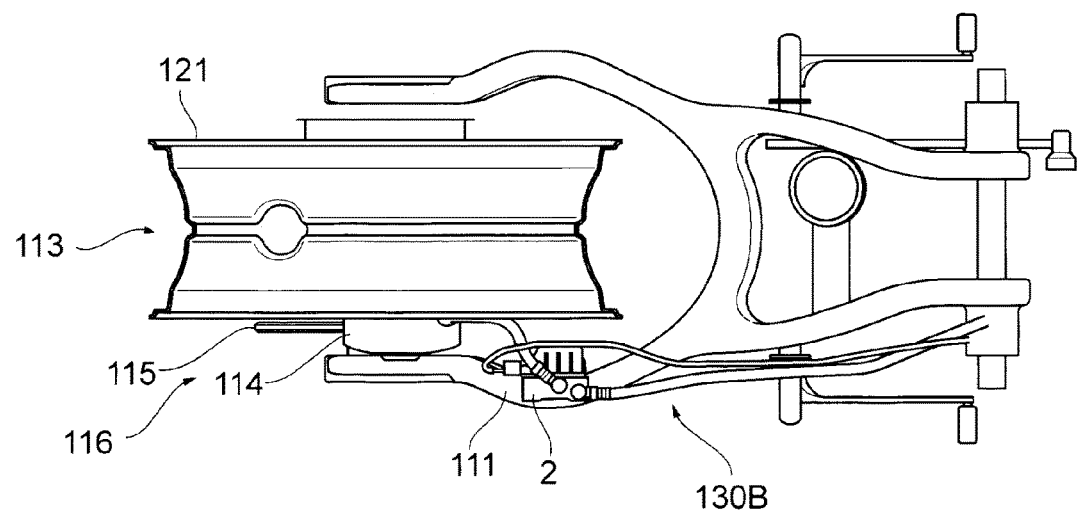
FIG. 12 is a top plan view of an essential part for explaining further another example of the state where the brake hydraulic pressure control device of the anti-lock brake system according to the first embodiment of the present invention is mounted on the motorcycle.

FIG. 11 is a side view of an essential part for explaining further another example of the state where the brake hydraulic pressure control device of the anti-lock brake system according to the first embodiment of the present invention is mounted on the motorcycle. FIG. 12 is a top plan view of an essential part for explaining further another example of the state where the brake hydraulic pressure control device of the anti-lock brake system according to the first embodiment of the present invention is mounted on the motorcycle. In FIG. 12, the illustration of the tire of the rear wheel 113 is omitted.

As shown in FIG. 11 and FIG. 12, the base body 6 of the brake hydraulic pressure control device 2 is fixed to the swing arm 111 "below the spring" of the connecting portion 130B directly or by way of a retainer. The brake hydraulic pressure control device 2 is arranged in a state where the base body 6 and the valve case 5 do not interfere with rotating members such as the rear wheel 113. Further, the brake hydraulic pressure control device 2 may preferably be arranged in a state where the base body 6 and the valve case 5 are positioned at portions other than a side portion of the swing arm 111. With such an arrangement, it is possible to surely position the brake hydraulic pressure control device 2 at a portion other than the primary ground contact portion and the secondary ground contact portion.

The manner of operation of the anti-lock brake system according to the first embodiment is described.

The brake hydraulic pressure control device 2 includes: the base body 6 in which the flow passages 31, 32, 33, 35, 36 are formed; and the valves (inlet-side electromagnetic valve 15, outlet-side electromagnetic valve 16) which open or close the flow passages 32, 36. The base body 6 is fixed to the connecting portions 130A, 130B which connect the trunk portion 101 of the motorcycle 100 and the wheels (front wheel 106, rear wheel 113) to each other. That is, the base body 6 is not fixed to the trunk portion 101. Accordingly, for example, necessity of changing the layout of respective parts of the trunk portion 101 depending on whether or not the brake system is of a type in which the brake hydraulic pressure control device 2 is incorporated is reduced. Further, necessity of arranging a pipe of the anti-lock brake system 1 having a complicated path in the trunk portion 101 is reduced. Further, by fixing the base body 6 "below the spring" of the connecting portions 130A, 130B, it is possible to suppress the occurrence of a phenomenon where design property, the degree of freedom in design and the like are lowered due to mounting of the base body 6 on portions other than the trunk portion 101. Accordingly, it is possible to enhance cost performance, manufacturing performance and the like of the motorcycle 100 while ensuring design property, the degree of freedom in design and the like.

In the brake hydraulic pressure control device 2, the base body 6 is fixed to the brake caliper 43, 107, 114. Accordingly, it is possible to simultaneously acquire both the enhancement of cost performance, manufacturing performance and the like of the motorcycle 100 and the enhancement of design property, the degree of freedom in design and the like.

In the brake hydraulic pressure control device 2, the base body 6 and the valves (inlet-side electromagnetic valve 15, outlet-side electromagnetic valve 16) are positioned other than the primary ground contact portion of the motorcycle 100. Further, in the brake hydraulic pressure control device 2, the base body 6 and the valves (inlet-side electromagnetic valve 15, outlet-side electromagnetic valve 16) are positioned at a portion other than the secondary ground contact portion of the motorcycle 100. Accordingly, it is possible to simultaneously acquire both the enhancement of cost performance, manufacturing performance and the like of the motorcycle 100 and the reduction of a possibility that the brake hydraulic pressure control device 2 is damaged due to turning over of the motorcycle 100.

In the brake hydraulic pressure control device 2, the base body 6 and the valves (inlet-side electromagnetic valve 15, outlet-side electromagnetic valve 16) are positioned inside the wheel rim 121 of the wheel (front wheel 106, rear wheel 113). Accordingly, it is possible to surely simultaneously acquire both the enhancement of cost performance, manufacturing performance and the like of the motorcycle 100 and the reduction of a possibility that the brake hydraulic pressure control device 2 is damaged by turning over of the motorcycle. Further, a possibility is reduced where the brake hydraulic pressure control device 2 is damaged by a scattering pebble or the like generated during traveling of the motorcycle 100.

In the brake hydraulic pressure control device 2, the controller 3 for the valves (inlet-side electromagnetic valve 15, outlet-side electromagnetic valve 16) is arranged on the trunk portion 101 in the motorcycle 100. That is, the miniaturized and light-weighted brake hydraulic pressure control device 2 is arranged "below the spring", whereby it is possible to suppress the occurrence of a phenomenon where the movement performance of the motorcycle 100 is lowered. Further, the controller 3 is not arranged "below the spring" and hence, it is possible to reduce a possibility that a failure occurs in the controller 3 due to a scattering pebble, splashed water or the like generated during traveling of the motorcycle 100.

Further, the brake hydraulic pressure control device 2 includes the valve case 5 in which the valves (inlet-side electromagnetic valve 15, outlet-side electromagnetic valve 16) are housed, and a region of the power source line 17 of the valves (inlet-side electromagnetic valve 15, outlet-side electromagnetic valve 16) arranged inside the valve case 5 and a region of the power source line 17 of the valves (inlet-side electromagnetic valve 15, outlet-side electromagnetic valve 16) arranged outside the valve case 5 are connected to each other not by means of a connector. Accordingly, it is possible to prevent the occurrence of a phenomenon where vibrations generated in the brake hydraulic pressure control device 2 is increased due to fixing of the base body 6 "below the spring" so that a connector is removed whereby an operation of the valve (inlet-side electromagnetic valve 15, outlet-side electromagnetic valve 16) becomes defective.

In the brake hydraulic pressure control device 2, the inlet valve hole 10 and the outlet valve hole 11 are formed in the first surface 7, the master cylinder port 12 and the wheel cylinder port 13 are formed in the second surface 8, and the accumulator port 14 is formed in the third surface 9. Accordingly, the miniaturized and light-weighted brake hydraulic pressure control device 2 is arranged "below the spring", whereby it is possible to suppress the occurrence of a phenomenon where the movement performance of the motorcycle 100 is lowered.

The anti-lock brake system 1 may preferably be a pumpless anti-lock brake system. In this case, it is unnecessary to mount a pump which becomes a pressure supply source of the hydraulic circuit 30 on the base body 6 and hence, the miniaturized and the light-weighted brake hydraulic pressure control device 2 is arranged "below the spring", whereby it is possible to suppress the occurrence of a phenomenon where the movement performance of the motorcycle 100 is lowered.

Further, in the brake hydraulic pressure control device 2, when the anti-lock brake system 1 is not a pumpless anti-lock brake system 1, a pump is not arranged "below the spring". Accordingly, the miniaturized and light-weighted brake hydraulic pressure control device 2 is arranged "below the spring", whereby it is possible to suppress the occurrence of a phenomenon where the movement performance of the motorcycle 100 is lowered.

An anti-lock brake system according to the second embodiment is described hereinafter.

The description which overlaps with the description of the anti-lock brake system according to the first embodiment is omitted when appropriate.

The detail of mounting of the brake hydraulic pressure control device of the anti-lock brake system according to the second embodiment is described.

Figure 13:
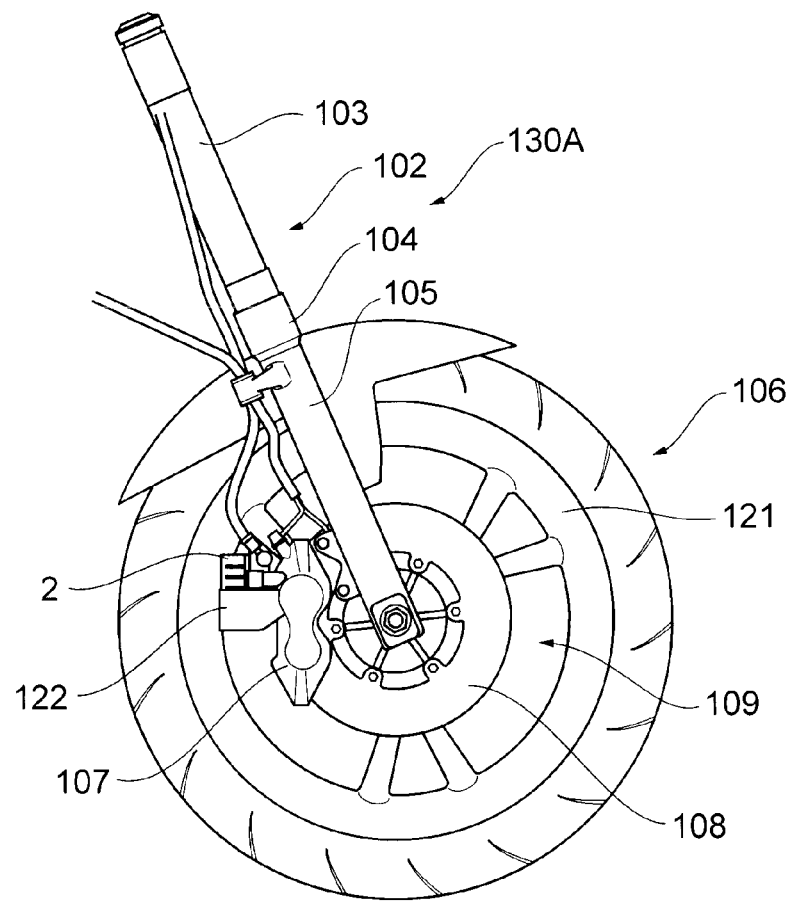
FIG. 13 is a side view of an essential part for explaining one example of a state where a brake hydraulic pressure control device of an anti-lock brake system according to a second embodiment of the present invention is mounted on a motorcycle.

FIG. 13 is a side view of an essential part for explaining one example of a state where the brake hydraulic pressure control device of the anti-lock brake system according to the second embodiment of the present invention is mounted on a motorcycle.

As shown in FIG. 13, the brake hydraulic pressure control device 2 includes a protective cover 122 which covers the base body 6 and the valve case 5. The protective cover 122 may cover whole brake hydraulic pressure control device 2 or only a part of the brake hydraulic pressure control device 2. For example, the protective cover 122 may preferably cover at least a lower portion of the brake hydraulic pressure control device 2. FIG. 13 shows the case where the protective cover 122 is provided to the brake hydraulic pressure control device 2 arranged in a state shown in FIG. 5 and FIG. 6. However, the protective cover 122 may be provided to the brake hydraulic pressure control device 2 arranged in other states shown in FIG. 7 to FIG. 12.

The manner of operation of the anti-lock brake system according to the second embodiment is described.

The brake hydraulic pressure control device 2 includes the protective cover 122 which covers at least a part of the base body 6 and the valves (inlet-side electromagnetic valve 15, outlet-side electromagnetic valve 16). Accordingly, it is possible to suppress the occurrence of a phenomenon where the brake hydraulic pressure control device 2 is easily damaged by a scattering pebble or the like during traveling of the motorcycle 100 due to the arrangement of the brake hydraulic pressure control device 2 "below the spring".

EXPLANATION OF SIGNS LIST

1: anti-lock brake system
2: brake hydraulic pressure control device
3: controller
5: valve case
6: base body
7: first surface
8: second surface
9: third surface
10: inlet valve hole
11: outlet valve hole
12: master cylinder port
13: wheel cylinder port
14: accumulator port
15: inlet-side electromagnetic valve
16: outlet-side electromagnetic valve
17: power source line
18: accumulator
30: hydraulic circuit
31 to 33, 35, 36: flow passage
34: check valve
41: master cylinder
42: brake
43, 107, 114: brake caliper
44: wheel cylinder
45: brake lever
100: motorcycle
101: trunk portion
102: front fork
103: front fork upper end portion
104: front suspension
105: front fork lower end portion
106: front wheel
108, 115: rotor
109: front brake
110: handle bar
111: swing arm
112: rear suspension
113: rear wheel
116: rear brake
117: seat
118: front brake lever
119: rear brake lever
121: wheel rim
122: protective cover
130A, 130B: connecting portion

The invention claimed is:

1. A brake hydraulic pressure control device for controlling a fluid pressure of a brake fluid supplied to a wheel cylinder mounted on a brake caliper of a motorcycle, the brake hydraulic pressure control device comprising:

a base body in which a flow passage is formed; and
a valve which opens or closes the flow passage, wherein the base body is fixed below a spring in a connecting portion which connects a trunk portion of the motorcycle and a wheel to each other, wherein the base body and valve are positioned inside a wheel rim of the wheel, wherein the wheel rim has an axis of rotation, a lateral extent in the direction of the axis of rotation, and a radial extent, and the base body and valve are within the both the lateral extent and the radial extent.

2. The brake hydraulic pressure control device according to claim 1, wherein the base body is fixed to the brake caliper.

3. The brake hydraulic pressure control device according to claim 1, wherein the base body and the valve are positioned at a portion other than a primary ground contact portion of the motorcycle.

4. The brake hydraulic pressure control device according to claim 3, wherein the base body and the valve are positioned at a portion other than a secondary ground contact portion of the motorcycle.

5. The brake hydraulic pressure control device according to claim 1, wherein a controller of the valve is arranged on the trunk portion.

6. The brake hydraulic pressure control device according to claim 1, further comprising a valve case which houses the valve therein, wherein a region of a power source line for the valve arranged inside the valve case and a region of the power source line for the valve arranged outside the valve case are connected to each other not by means of a connector.

7. The brake hydraulic pressure control device according to claim 1, further comprising a protective cover which covers at least a portion of the base body and the valve.

8. The brake hydraulic pressure control device according to claim 1, wherein the base body includes: a first surface in which a valve hole for housing the valve is formed; a second surface in which a master cylinder port communicating with a master cylinder and a wheel cylinder port communicating with the wheel cylinder are formed; and a third surface in which an accumulator port communicating with an accumulator is formed.

9. The brake hydraulic pressure control device according to claim 8, wherein the first surface, the second surface and the third surface are orthogonal to each other.

10. The brake hydraulic pressure control device according to claim 1, wherein the wheel is a front wheel.

11. The brake hydraulic pressure control device according to claim 1, wherein the wheel is a rear wheel.

12. An anti-lock brake system comprising the brake hydraulic control device described in claim 1.

13. The anti-lock brake system according to claim 12, wherein the anti-lock brake system is a pumpless anti-lock brake system.

* * * * *